US008560383B2

(12) United States Patent
Davis et al.

(10) Patent No.: US 8,560,383 B2
(45) Date of Patent: Oct. 15, 2013

(54) METHOD AND APPARATUS FOR DISTRIBUTING ELECTRONIC COUPONS

(75) Inventors: Brian Jeffrey Davis, Raleigh, NC (US); Timothy Clay Doyle, Cary, NC (US); Todd Donald McCormack, Durham, NC (US)

(73) Assignee: Toshiba Global Commerce Solutions Holding Corporation, Tokyo (JP)

( * ) Notice: Subject to any disclaimer, the term of this patent is extended or adjusted under 35 U.S.C. 154(b) by 1902 days.

(21) Appl. No.: 11/535,642

(22) Filed: Sep. 27, 2006

(65) Prior Publication Data

US 2008/0077486 A1    Mar. 27, 2008

(51) Int. Cl.
*G06Q 30/00* (2012.01)

(52) U.S. Cl.
USPC ............... 705/14.1; 705/14.13; 705/14.36

(58) Field of Classification Search
USPC .......................................................... 705/1–20
See application file for complete search history.

(56) References Cited

U.S. PATENT DOCUMENTS

| | | | | |
|---|---|---|---|---|
| 5,185,695 | A | * | 2/1993 | Pruchnicki ................. 705/14.26 |
| 6,035,280 | A | | 3/2000 | Christensen |
| 2002/0046116 | A1 | * | 4/2002 | Hohle et al. ..................... 705/14 |
| 2003/0233276 | A1 | * | 12/2003 | Pearlman et al. ................ 705/14 |
| 2004/0064365 | A1 | | 4/2004 | Sjoblom et al. |
| 2004/0117255 | A1 | | 6/2004 | Nemirofsky et al. |
| 2004/0143500 | A1 | | 7/2004 | Lopez et al. |
| 2005/0071230 | A1 | | 3/2005 | Mankoff |
| 2005/0075932 | A1 | | 4/2005 | Mankoff |
| 2005/0222910 | A1 | * | 10/2005 | Wills ............................... 705/22 |
| 2005/0234771 | A1 | * | 10/2005 | Register et al. ................. 705/14 |
| 2005/0267812 | A1 | | 12/2005 | Jensen et al. |
| 2006/0020508 | A1 | | 1/2006 | Gorti et al. |
| 2006/0036491 | A1 | | 2/2006 | Leung et al. |
| 2006/0089876 | A1 | | 4/2006 | Boys |
| 2006/0089878 | A1 | | 4/2006 | Roberts et al. |

OTHER PUBLICATIONS

Noth, "Even Cybersurfers Gotta Eat: A Look at the State of the Art in Food Couponing", Digital Edge, 1999, pp. 1-11. http://www.digitaledge.org/monthly/1999_02/foodcoup.html.

* cited by examiner

*Primary Examiner* — Sun Li
(74) *Attorney, Agent, or Firm* — Yee & Associates

(57) ABSTRACT

A computer implemented method, data processing system, and computer program product for distributing, and redeeming manufacturer coupons for a product purchase in a retail environment. With the mechanism of the illustrative embodiments, the data processing system of a retailer (hereinafter the loyalty coupon system) receives an electronic coupon from a manufacturer. The loyalty coupon system links the product to the inventory control system of the retail environment. The loyalty coupon system then targets the electronic coupon to customers that have subscribed to the loyalty coupon system. The coupon system provides for the communication of the product coupon directly to each subscribed customer on the list. Upon a customer selecting the coupon, the loyalty coupon system configures a customer reward. Upon the customer purchasing the product using their loyalty card, the loyalty coupon system disburses the customer reward at the point of sale. The manufacturer is billed for the redeemed coupon.

20 Claims, 6 Drawing Sheets

| | CUSTOMER DATABASE 522 | | |
|---|---|---|---|
| 502 CUSTOMER NUMBER | ADA11111 | BFB22222 | CGC33333 |
| 504 NAME | ALICE DOE | SALLY SMITH | LUCY NGUYEN |
| 506 ADDRESS | 123 SCHOOL LANE CHERRY HILL, TX | 1776 FRANKLIN ST. SOUTH CHERRY HILL, TX | 1492 COLUMBUS CIR. STONETOWN, TX |
| 508 REGION/DIV | 322-SW | 365-SW | 700-SW |
| 510 LOYALTY CARD NUMBER(S) | 11111ada | 22222bfb | 33333cgc |
| 512 MOBILE EMAIL ADDRESS | ALICE.EMAIL | SALLY.EMAIL | LUCY.EMAIL |
| 514 MOBILE PHONE NUMBER | 999-888-1111 | 999-888-2222 | 999-777-3333 |
| 516 REWARDS TRACKING | $14.73 | $0.00 | $72.14 |
| 518 TOTAL MOBILE PHONE REDEMPTIONS | 2 | 0 | 12 |
| 520 TOTAL EMAIL REMEMPTIONS | 3 | 0 | 0 |

500

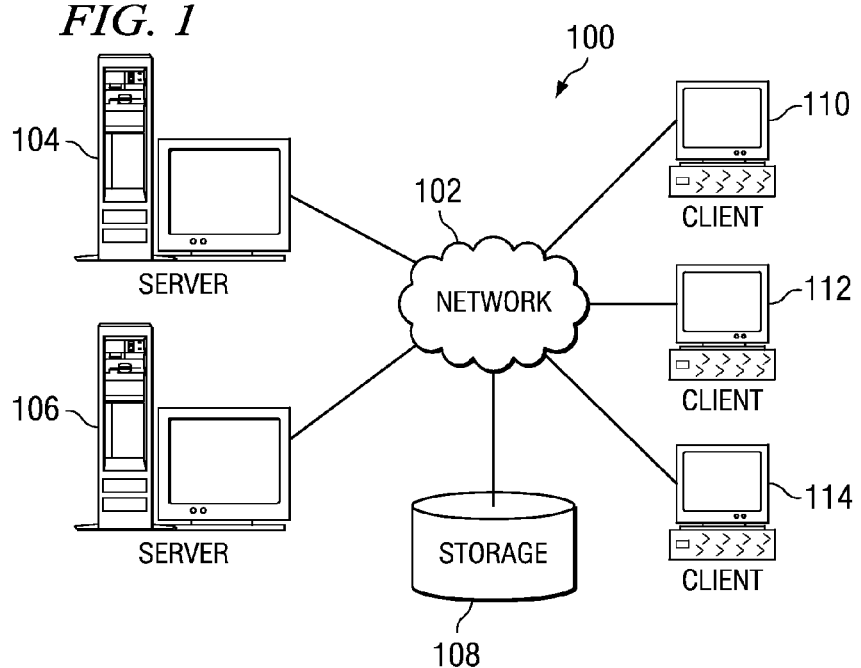
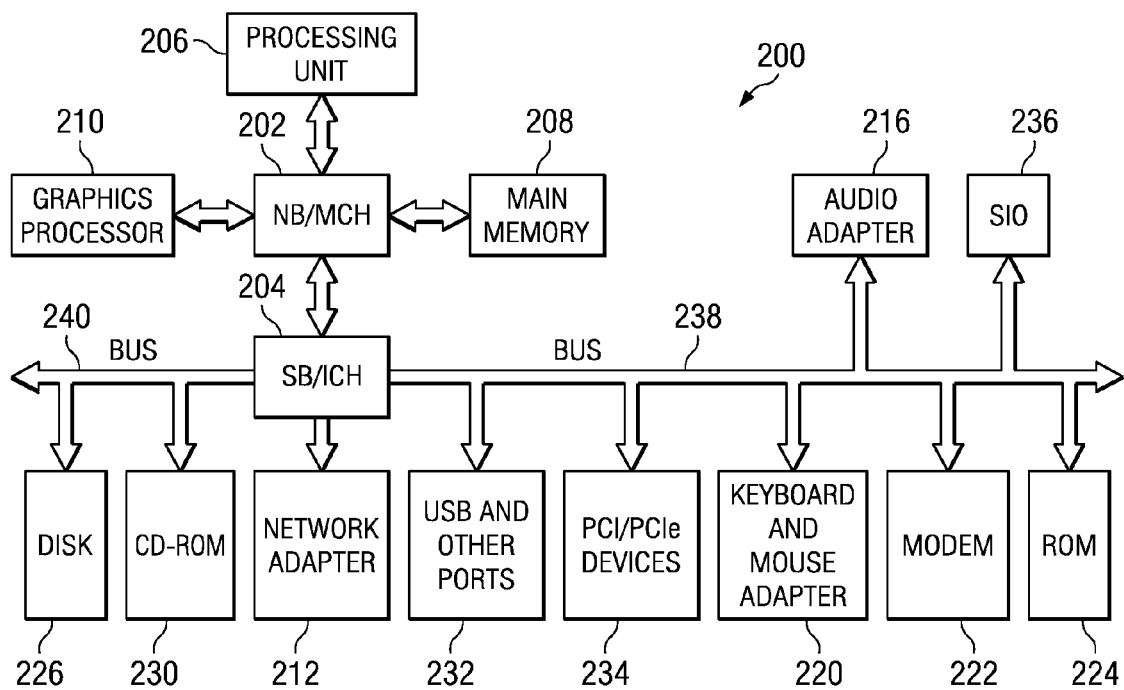

FIG. 4

MANUFACTURER COUPON DATABASE

| | 422 | 424 | 426 |
|---|---|---|---|
| 402 COUPON NUMBER | 6265562655 | 20255020255 | 8117481174 | 1116771116 |
| 404 MANUFACTURER | COLOR BEST | BLACK DECK | GROW FAST | COLOR BEST |
| 406 COUPON DESCRIPTION | BASE PAINT 1 GALLON | ELECTRIC JIG SAW | VEGETABLE SEEDS | OUTDOOR PAINT 1 GALLON |
| 408 FACE VALUE | $7.50 | $15.00 | $0.05 | $10.00 |
| 410 REGION | 322-SW | 300-400-SW | SW | 322-SW |
| 412 START DATE | 14-APR-06 | 1-APR-06 | 1-APR-06 | 1-MAY-06 |
| 414 STOP DATE | 28-APR-06 | 1-JUL-06 | 1-JUL-06 | 1-JUN-06 |
| 416 NUMBER REDEEMED | 22 | 30 | 2120 | 0 |
| 418 TOTAL VALUE REDEEMED | $165.00 | $450.00 | $106.00 | $0.00 |
| 420 NUMBER OF COUPONS AUTHORIZED | 500 | 50 | 10,000 | 100 |

| | CUSTOMER DATABASE | | |
|---|---|---|---|
| | | 522 ↘ | |
| 502 — CUSTOMER NUMBER | ADA11111 | BFB22222 | CGC33333 |
| 504 — NAME | ALICE DOE | SALLY SMITH | LUCY NGUYEN |
| 506 — ADDRESS | 123 SCHOOL LANE CHERRY HILL, TX | 1776 FRANKLIN ST. SOUTH CHERRY HILL, TX | 1492 COLUMBUS CIR. STONETOWN, TX |
| 508 — REGION/DIV | 322-SW | 365-SW | 700-SW |
| 510 — LOYALTY CARD NUMBER(S) | 11111ada | 22222bfb | 33333cgc |
| 512 — MOBILE EMAIL ADDRESS | ALICE.EMAIL | SALLY.EMAIL | LUCY.EMAIL |
| 514 — MOBILE PHONE NUMBER | 999-888-1111 | 999-888-2222 | 999-777-3333 |
| 516 — REWARDS TRACKING | $14.73 | $0.00 | $72.14 |
| 518 — TOTAL MOBILE PHONE REDEMPTIONS | 2 | 0 | 12 |
| 520 — TOTAL EMAIL REMEMPTIONS | 3 | 0 | 0 |

Figure 6:
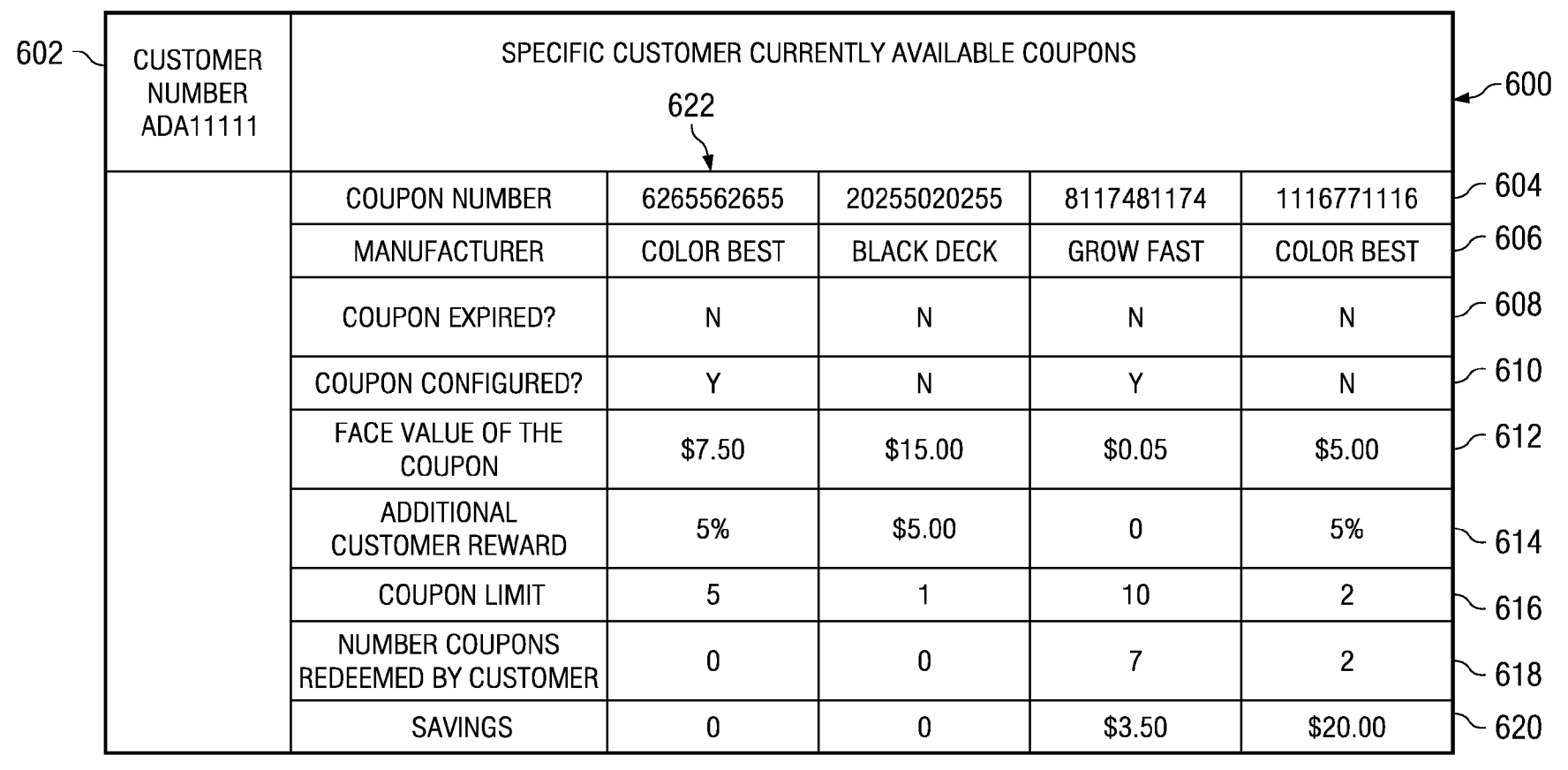

| | SPECIFIC CUSTOMER CURRENTLY AVAILABLE COUPONS 622 | | | |
|---|---|---|---|---|
| COUPON NUMBER | 6265562655 | 20255020255 | 8117481174 | 1116771116 |
| MANUFACTURER | COLOR BEST | BLACK DECK | GROW FAST | COLOR BEST |
| COUPON EXPIRED? | N | N | N | N |
| COUPON CONFIGURED? | Y | N | Y | N |
| FACE VALUE OF THE COUPON | $7.50 | $15.00 | $0.05 | $5.00 |
| ADDITIONAL CUSTOMER REWARD | 5% | $5.00 | 0 | 5% |
| COUPON LIMIT | 5 | 1 | 10 | 2 |
| NUMBER COUPONS REDEEMED BY CUSTOMER | 0 | 0 | 7 | 2 |
| SAVINGS | 0 | 0 | $3.50 | $20.00 |

CUSTOMER NUMBER ADA11111

METHOD AND APPARATUS FOR DISTRIBUTING ELECTRONIC COUPONS

BACKGROUND OF THE INVENTION

1. Field of the Invention

The present invention relates generally to an improved data processing system, and in particular, the present invention provides a computer implemented method, data processing system, and computer program product for distributing and redeeming a manufacturer coupon for a product in a retail environment.

2. Description of the Related Art

Customers clip manufacturers' coupons out of newspapers and magazines for products that the customer may purchase. The customer may take minutes or hours every week to find the specific coupons for the products they are interested in purchasing. Then the customer must remember to take the coupon to the retail outlet and buy the exact product specified in the coupon in order to redeem the coupon. In some cases, the coupon may be redeemed the same as cash. For example, if the customer has a $7.50 off coupon on a can of paint, the cashier takes the coupon as though it were cash.

The coupons in each cash drawer are added up as if they were cash, and that amount is added to the cash sum to be sure the overall total for the drawer is accurate. Then in the case of a retail chain, all of the manufacturers' coupons are sent to the retailer's corporate headquarters, typically once a week.

In the big store chains, the value of the coupons can easily total several million dollars per week. The coupons are typically sent to a clearinghouse where the coupons are sorted. Eventually the coupons will be delivered back to the manufacturer for redemption. The retailer may receive a small processing fee in addition to the face amount of the coupon. However, from the perspective of the retailer, there is little advantage to accepting a manufacturer's coupon other than remaining competitive with other retailers.

Increasingly however, the customer is responsible for sending the coupon back to the manufacturer with a proof of purchase to receive the discount on the product. This is an inconvenience to the customer.

BRIEF SUMMARY OF THE INVENTION

The illustrative embodiments provide a computer implemented method, data processing system, and computer program product for distributing and redeeming manufacturer coupons for a product purchase in a retail environment. A data processing system of a retailer receives an electronic coupon directly from a manufacturer that manufactures the product. The data processing system of the retailer links the electronic coupon to the product in an inventory control system of the retail environment. The data processing system of the retailer selects a customer to receive the electronic coupon based on marketing data associated with the customer, whereby the customer is a subscriber in a loyalty coupon system of the retail environment. The data processing system of the retailer communicates the electronic coupon directly to the customer. The electronic coupon is received by the customer via a personal communication device equipped with a selecting function. In response to receiving a selection of the electronic coupon by the customer which indicates an interest in purchasing the product promoted by the electronic coupon, the data processing system of the retailer configures an account for a loyalty card associated with the customer in order fro the customer to receive a customer reward through the loyalty coupon system for the product promoted by the electronic coupon. In response to the customer purchasing the product promoted by the electronic coupon using the loyalty card, the data processing system of the retailer disburses the customer reward to the customer at a point of sale. The data processing system of the retailer tracks a total number of electronic coupons redeemed by each of a mobile telephone number and an email address associated with the customer without using a clearinghouse. The data processing system of the retailer bills the manufacturer directly for the redeemed electronic coupon without using the clearinghouse.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a network of data processing systems in which illustrative embodiments may be implemented;

FIG. 2 shows a block diagram of a data processing system in which illustrative embodiments may be implemented;

FIG. 4 shows a manufacturer coupon database for distributing and redeeming a manufacturer coupon in a retail environment in accordance with the illustrative embodiments;

FIG. 5 is a sample of a customer database for distributing and redeeming a coupon in a retail environment in accordance with the illustrative embodiments;

FIG. 6 is an individual customer record of the customer's available coupons in accordance with the illustrative embodiments.

DETAILED DESCRIPTION OF THE INVENTION

Figure 3:
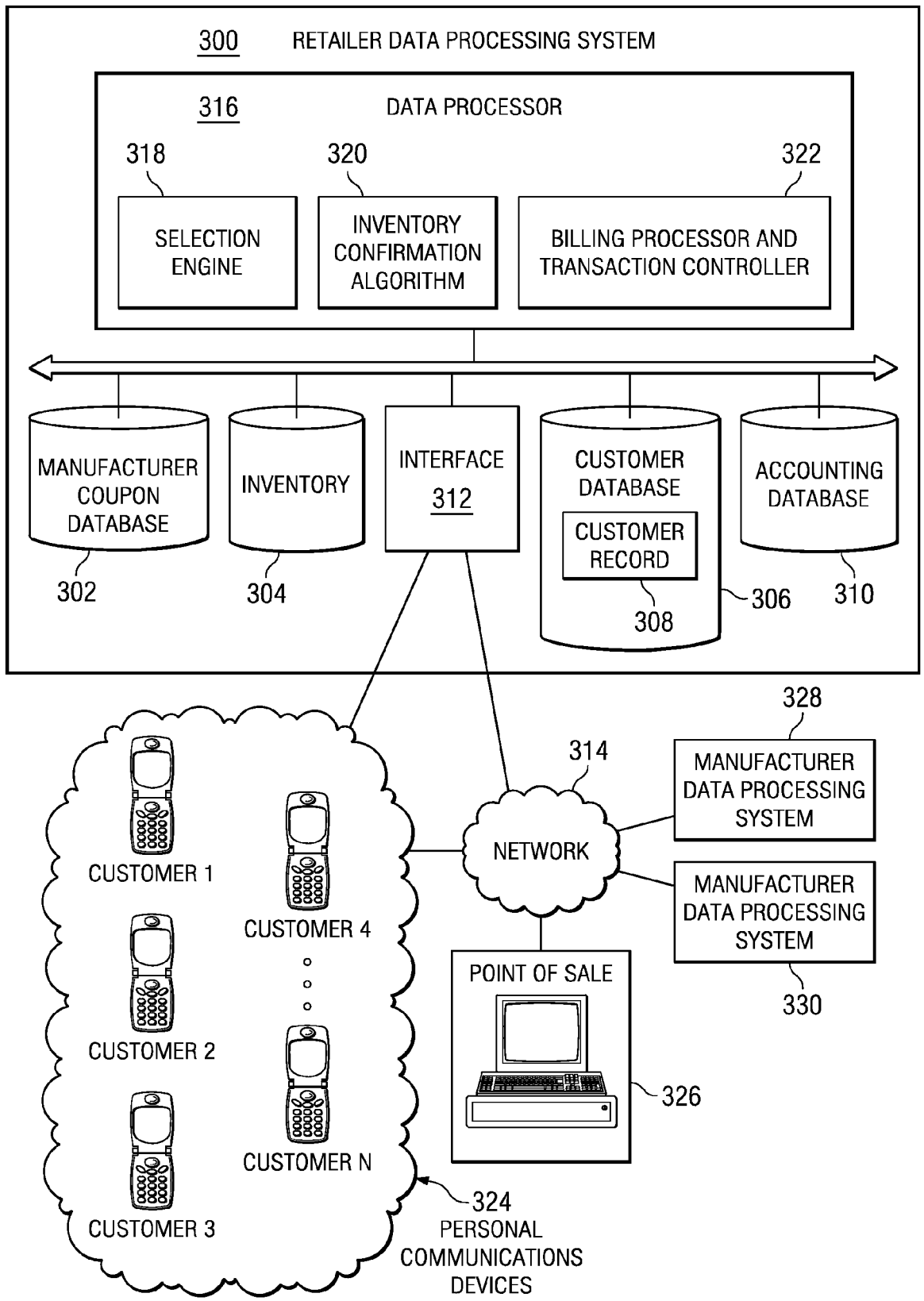
FIG. 3 depicts a block diagram of the components in which the method for distributing and redeeming a coupon in a retail environment is implemented in accordance with the illustrative embodiments.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a method for distributing and redeeming coupons for a product purchase in a retail environment. In particular, the mechanism of the illustrative embodiments allow a retailer to offer the cost savings of a manufacturer's coupon to a customer through the retailer's loyalty card account.

Consider the case of a customer, Alice Doe. Alice regularly shops at Giant Hardware retail store. She is a member of Giant Hardware's loyalty card program. A loyalty card may also be known by other names such as a rewards card, a club card, or a points card. A loyalty card is usually a plastic or paper card, visually similar to a credit card, that identifies the cardholder as a member in a retail incentives program. A retail incentives program commonly entitles the customer to discounts based upon card use and retail promotions. By presenting the loyalty card, the customer is typically entitled to a store discount on a current purchase or an allotment of points that can be used for future purchases. Loyalty cards typically have a barcode or magnetic stripe that can be easily scanned. Another example of a loyalty card may be a small key ring card. Further examples of loyalty cards are semiconductor chip cards, or radio frequency identity cards. As defined herein a loyalty card is any form of identification that links the customer to the retailer's loyalty card system. A retailer's loyalty card system is a system that tracks the purchases of each customer and provides incentives for the customer to purchase merchandise from the retailer. As defined herein, a loyalty card does not provide a means of payment for merchandise except through the retailer's incentive program. In other words, a loyalty card is not a credit or debit card.

In addition to using her loyalty card when she shops at Giant Hardware, Alice subscribed to Giant Hardware's loyalty coupon system in accordance with the illustrative embodiments. Alice subscribed to the loyalty coupon system by providing information that included personal contact information such as a mobile phone number and marketing data such as brand preferences. Of course, those of ordinary skill in the art could identify many more fields of information that would be useful clues as to which coupons would interest Alice.

Alice receives a text mail message on her mobile phone from Giant Hardware. The communications from Giant Hardware may be periodic (as an example once a week) or non-periodic within the scope of the illustrative embodiments. The message lists manufacturer coupons that Alice is eligible to redeem at Giant Hardware stores. Alice scans the list of coupons, selecting the coupons for the products she is interested in purchasing. In this example, Alice selects a coupon for Color Best paint and another coupon for a Black Deck electric jigsaw. Alice may select the coupons in which she is interested by pressing a predefined button on her mobile phone. Alice may also have the option to press a "select all" button thereby selecting all of the coupons in the available coupon list.

Upon Alice's selection, Giant Hardware's loyalty coupon system configures Alice's loyalty card account to reward Alice. Thus if she purchases the product promoted by the selected manufacturer coupon, she will receive the reward. The loyalty coupon system configures Alice's loyalty card account to at least redeem the face value of the manufacturer coupon. The loyalty coupon system may also add incentives to reward Alice for purchasing the selected products at a Giant Hardware store. The incentives may be in the form of additional discounts or adding points to a system that calculates future discounts.

The following week Alice shops at Giant Hardware and purchases Color Best paint. Alice purchases the paint using her Giant Hardware loyalty card, without presenting any coupons. However, the coupon Alice preselected on her mobile phone is redeemed automatically. In addition, Alice may also receive store points, which are discounts on future purchases in the store, as a reward for using the coupon system or additional discounts on her current purchase. Alice's purchases may be tracked, analyzed, and used to provide coupons that are targeted more directly towards Alice. Giant Hardware then invoices Color Best for the cost of redeeming the Color Best coupon.

Turning now to FIG. 3, a block diagram is depicted of the components in which the method for distributing, and redeeming a coupon in a retail environment is implemented in accordance with the illustrative embodiments.

The coupon system resides in Retailer Data Processing System 300, such as data processing system 200 in FIG. 2. Among the components available to the loyalty coupon system are Manufacturer Coupon Database 302, Inventory 304, and Customer Database 306, which includes individual customer records 308. Additional components are Accounting Database 310 and Interface 312. Interface 312 provides interconnectivity to the manufacturer's data processing systems. Interface 312 also provides the implementation method to communicate with the specified customers. Interface 312 is connected to network 314, such as network 102 in FIG. 1.

Retailer Data Processing System 300 also contains data processor 316, such as processing unit 206 in FIG. 2. Processing unit 316 contains customer selection engine 318, inventory confirmation algorithm 320, and billing processor and transaction controller 322. Selection engine 318 determines which customers are targeted to receive specific electronic coupons. Inventory confirmation algorithm 320, confirms that the product promoted by a manufacturer coupon is sold in the retail environment. Billing processor 322 tracks and invoices each manufacturer for the coupons redeemed.

Manufacturers, through manufacturer data processing systems 328 and 330, communicate their electronic coupons and associated information through network 314 and interface 312. Customers are contacted through personal communications devices 324, such as mobile phones, land based phones, personal computers, and PDA devices. Personal communications devices 324 may be clients on a network such as clients 110, 112 and 114 of FIG. 1. Personal communications devices 324 are connected to network 314.

FIG. 4 shows a manufacturer coupon database for distributing, and redeeming a manufacturer coupon in a retail environment in accordance with the illustrative embodiments. Manufacturer coupon database 400, such as manufacturer coupon database 302 of FIG. 3, consists of coupon records. Before each coupon is added to manufacturer coupon database 400, the inventory confirmation algorithm, such as inventory confirmation algorithm 320 of FIG. 3, confirms that the product promoted by the coupon is sold by the retailer and that the product is in stock.

Each coupon record in manufacturer coupon database 400, contains coupon number 402, manufacturer name 404, coupon description 406, face value of each coupon 408, region in which the coupon is active 410, start date of the coupon 412, stop date of the coupon 414, number of coupons that have been redeemed 416, total value of the coupons that have been redeemed 418, and number of coupons the manufacturer is authorizing 420.

Looking now at column 422, coupon number 402 is 6265562655, the manufacturer 404 is Color Best. Coupon description 406 is one gallon of base paint. Face value 408 of the coupon is $7.50. The face value of a coupon is the promoted value of the coupon. Region 410 is 322-SW. Region can be defined in a grid as in this example or in another convenient method in accordance with the illustrative embodiments. The coupon is valid between the start date, 14 Apr. 2006 and the stop date, 28 Apr. 2006. A billing processor and transaction controller, such as billing processor and transaction controller 322 of FIG. 3, confirms that the coupon is being redeemed within the active timeframe and the active region before the customer receives the reward. The record for coupon number 6265562655 (column 422) indicates that 22 coupons (number redeemed in row 416) have been redeemed for the base paint, for a total value of $165.00 (total value redeemed in row 418). The billing processor and transaction controller uses the total value information to invoice the manufacturer for the redeemed coupons. The manufacturer has authorized the number of coupons to be redeemed to be 500 coupons (number of coupons authorized in row 420). The number of coupons to which the retailer is limited is further information for a customer selection engine, such as selection engine 318 of FIG. 3. The selection engine must consider the number of coupons that may be redeemed in determining which customers receive the electronic coupons.

Column 424 contains coupon number 20255020255 which is a coupon for an electric jigsaw from Black Deck manufacturer. The region the coupon is valid in is a range from 300-SW to 400-SW. The region is larger for this electronic coupon than for the paint coupon record of column 422. The region in which a coupon is offered may be used to determine to which customers electronic coupons are distributed. The coupon is valid between Apr. 1, 2006 and Jul. 1, 2006. Thirty of the fifty authorized coupons have been redeemed to data, for a total value of $450.00.

Column 426 contains information for coupon number 8117481174. Coupon number 8117481174 is a coupon from the Grow Fast manufacturer for vegetable seeds. Each coupon has a face value of five cents. The region for which the coupon is available is the entire SW region. The coupon is valid between Apr. 1, 2006 and Jul. 1, 2006. There have been 2120 coupons redeemed out of the 10,000 coupons authorized, for a total redeemed value of one hundred and six dollars. The selection engine may offer additional electronic coupons to additional customers to increase the percentage of redeemed coupons for the vegetable seeds.

FIG. 5 is a sample of a customer database for distributing and redeeming a coupon in a retail environment in accordance with the illustrative embodiments. Customer number 502 is assigned to each customer. The customer's name, address, region, and loyalty card number are stored in fields; name 504, address 506, region 508, and loyalty card number 510 respectively. A customer may have more than one loyalty card number stored in the system. The customer also provides their email address 512 and mobile phone number 514 so that the retailer can contact them with the loyalty coupon lists. The customer can choose any form of personal communication device and provide the loyalty coupon system with instructions for accessing the device. One such set of instructions must be supplied to the loyalty coupon system.

The total amount of rewards the customer has received from the loyalty coupon system is listed in rewards tracking 516. Further information for each customer such as total mobile phone redemptions 518, and total email redemptions 520 that the customer has redeemed is information that can be used by the retailer for further targeted coupon lists. For those of ordinary skill in the art it can be appreciated that more fields of interest may be included. Column 522 is a record for customer Alice Doe, customer number ADA11111. Alice provided the loyalty coupon system with both her email address, Alice.email, and her mobile phone number, 999-888-1111. Customer database 500 indicates that Alice has redeemed $14.73 from the loyalty coupon system. Customer database 500, further shows that Alice has redeemed 2 electronic coupons from mobile phone selections, and 3 electronic coupons from email selections.

FIG. 6 is an individual customer record of the customer's available coupons in accordance with the illustrative embodiments. Specific Customer Currently Available Coupons 600 is a record for an individual customer, stored in a customer database, such as customer database 306 of FIG. 3. The table listed here is for customer ADA11111 602. Customer ADA11111 is also listed in customer database 500 of FIG. 5. The illustrative embodiments are not limited to the example configuration of databases, indeed all of the data illustrated in separate databases could be stored in a single relational database or the data could be distributed to individual databases for example, and be within the scope of these embodiments.

Specific Customer Currently Available Coupons 600 contains coupon number 604, manufacturer 606, and notification of expired coupon 608. In addition, Specific Customer Currently Available Coupons table 600 contains coupon configured field 610 to indicate if the customer selected the electronic coupon. If the customer has selected the electronic coupon, the coupon is marked "Y" in Specific Customer Currently Available Coupon Database 600 as configured. Configured coupons show face value of the coupon 612 and additional customer rewards 614.

The loyalty coupon system may always disburse the face value of the coupon to the customer at the point of sale, however, the additional customer reward may be tailored to the specific customer. In this example, customer ADA11111 is configured to receive the face value of the manufacturer coupon $7.50 and customer ADA11111 is configured to receive 5% discount on the product purchase. Those of ordinary skill in the art will appreciate that many forms of additional rewards may be configured, such as a percent discount on the entire transaction, or free shipping of the product. Referencing the customer database, customer number ADA11111 can be recognized as Alice Doe. The record in column 622 can be recognized as the record of Alice Doe at the time she selected the Color Best coupon for paint and before she purchased and redeemed the Color Best coupon. Column 622 indicates that upon disbursement of the customer reward Alice will receive a discount of $7.50 and additional reward of a 5% discount on the Color Best paint.

The number of coupons redeemed by this customer is shown in coupons redeemed 618 and the number of coupons to which the customer is limited is shown in coupon count limit 616. The manufacturer or the retailer may wish to limit the number of coupons redeemed by any one customer. The billing processor and transaction controller, such as the billing processor and transaction controller 322 of FIG. 3, confirms that the customer has not exceeded the number of coupons authorized before redeeming a coupon. Savings are indicated in savings field 620.

Figure 7:
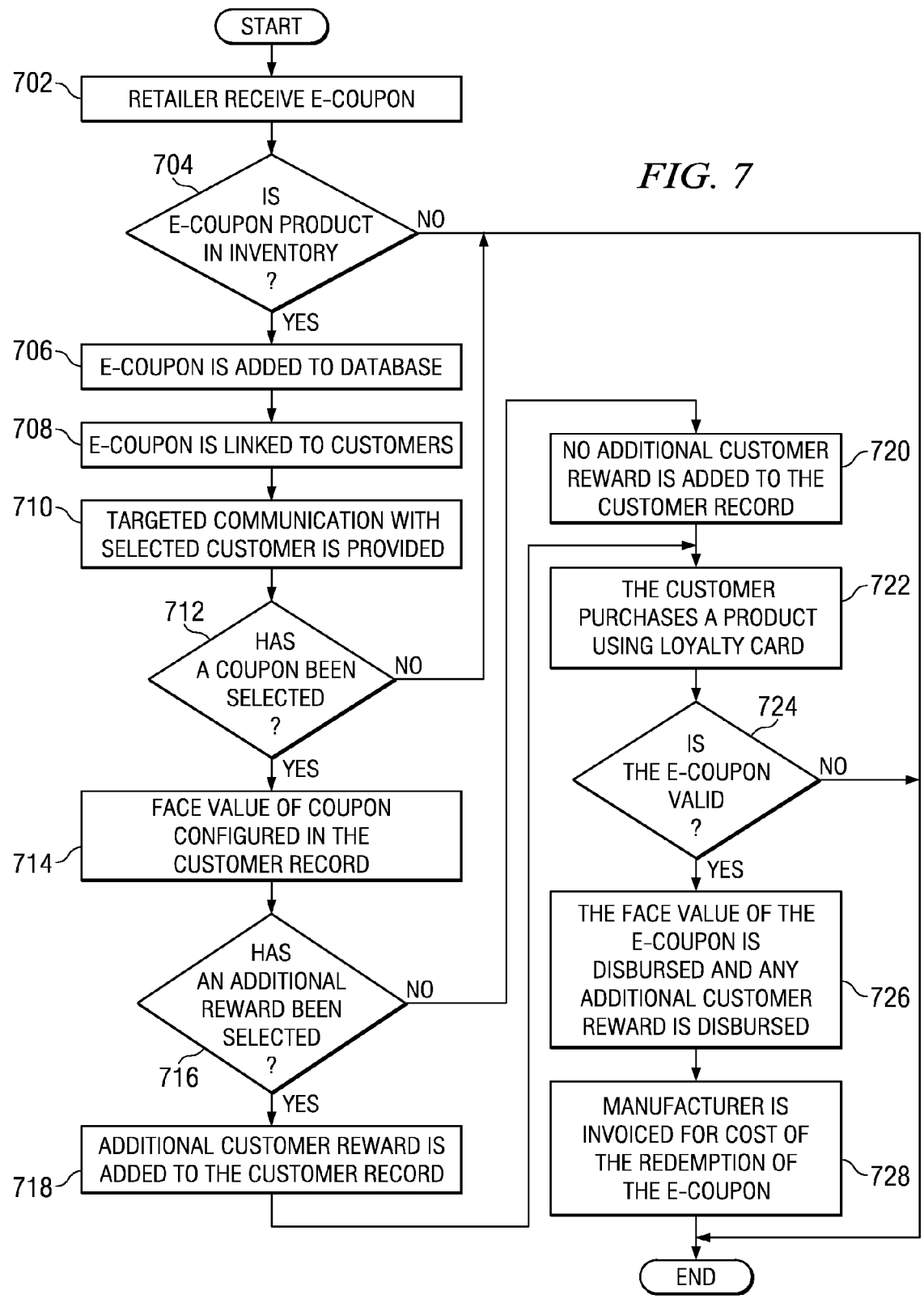
FIG. 7 is a top-level flow chart of the overall method for distributing and redeeming a manufacturer's coupon in a retail environment in accordance with the illustrative embodiments.

FIG. 7 depicts a top-level flow chart of the overall method for distributing and redeeming a manufacturer coupon for a product in a retail environment in accordance with the illustrative embodiments. A manufacturer sends an electronic coupon to the retailer (step 702). The manufacturer may send an authorization for a particular number of coupons for a retailer to redeem or the manufacturer may leave the decision of the number of coupons to be redeemed with the retailer. Upon the loyalty coupon system receiving an electronic coupon from a manufacturer, the inventory confirmation algorithm, such as the inventory confirmation algorithm 320 of FIG. 3, checks that the product, promoted by the electronic coupon, is sold and is in stock in the retail environment (step 704). If the product is not in inventory, (no output for step 704) the process ends. If the product is in inventory, (yes output for step 704) the loyalty coupon system adds the coupon to the manufacturer coupon database (step 706). An example of the manufacturer coupon database is element 302 of FIG. 3 or element 400 of FIG. 4.

Next, a selection engine, such as selection engine 318 of FIG. 3, links the coupon to a list of customers from the retailer's loyalty coupon system and stores the information in a customer database, (step 708) such as example customer database 500 of FIG. 5. The loyalty coupon system then provides for targeted communication to the customers through the personal communication devices of the customers (step 710). This communication may be implemented via mobile phone, personal computer, or personal digital device. The method of communication may be audio, text messaging, or streaming video. The retailer may choose to compile a list of electronic coupons, perhaps an assortment from multiple manufacturers, and send them to the customer in a single transaction.

Upon receiving the electronic coupons, the customer may select a particular coupon or coupons on the list by pressing a predefined button on the mobile phone. In other examples, the customer receives a list of electronic coupons in an email correspondence, in an instant messaging system, on a personal digital device, or on a land based telephone system. In each of these examples, the customer may select a particular coupon or coupons on the list. The loyalty coupon system determines if a coupon has been selected (step 712). If the customer does not select any coupons (no output for step 712), the process ends. If the customer selects a coupon (yes output for step 712), the coupon is configured in the Specific Customer Currently Available Coupon record, such as record 600 of FIG. 6, and the face value of the manufacturer coupon is configured in the record (step 714). The selection engine may determine an additional customer reward depending on the user configuration of the loyalty coupon system (step 716). If an additional customer reward is selected (yes output to step 716), the additional customer reward will be added to the record (step 718). If no additional customer reward is selected (no output to step 716) the additional customer reward is recorded as zero (step 720) and the customer will be receive the face value of the manufacturer coupon as the customer reward.

The customer may then present the product at a point of sale by offering to purchase the product in the retail environment using their loyalty card (step 722). The billing processor and transaction controller, such as element 322 of FIG. 3, confirms that the electronic coupon is currently valid (step 724). If the electronic coupon is not valid the process ends. If the electronic coupon is valid, the face value of the coupon plus any additional customer reward is disbursed to the customer at the point of sale (step 726). The loyalty coupon system tracks the coupons that each customer has configured and redeemed. This customer information may be part of the information used by the coupon system in order to make the choice to which customers to send a coupon. The retailer then may use the information in the loyalty coupon system to invoice the manufacturer for the cost of the coupon (step 728).

The illustrative embodiments provide a computer implemented method, data processing system, and computer program product for distributing and redeeming manufacturer coupons for a product purchase in a retail environment. The customer subscribes to the retailer's special loyalty coupon system, which entails providing the retailer with a method for personally contacting the customer. The customer may also provide a type of profile for the retailer describing which type of coupons would be most likely to be selected and redeemed by the customer. The customer then receives and reviews the coupon list sent to the customer via the customer's preferred personal method of contact. The customer then selects the coupons of interest. The customer may then shop at the retail store and redeem the manufacturers coupons previously selected. The customer has the advantage of not having to remember the coupons again as the discount will be automatically taken when the customer uses their loyalty card. The customer may also be selected to receive additional rewards from the retailer based on the retailer's configuration of the loyalty coupon system.

From the perspective of the manufacturer, the advantages of a loyalty coupon system based at the retailers are that an electronic coupon is created and sent to the retailer. The manufacturer may not have to have the coupons printed in any periodicals. The manufacturer may then be invoiced for the coupons redeemed without having to either sort through the coupons or hire a clearinghouse to sort through the coupons, thus saving the cost of processing the paper coupons. The manufacturer may also benefit through the added incentives the retailer provides to the customer for buying the manufacturer's product.

From the perspective of the retailer, the overhead of maintaining a loyalty card account for each customer is typically in place. The customers will subscribe to the loyalty coupon service and provide additional information and permission to be contacted with loyalty coupon offers. This additional information may be useful marketing and demographic information. The retailer has the advantage of linking the manufacturer's coupon to the retail store, thus bringing in more sales. Finally, the retailer has the added advantage of not having to process paper coupons.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The computer-readable medium can be an electronic system. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for distributing and redeeming manufacturer coupons for a product in a retail environment, the computer implemented method comprising:

receiving, by a data processing system of a retailer, an electronic coupon directly from a manufacturer that manufactures the product;

linking, by the data processing system of the retailer, the electronic coupon to the product in an inventory control system of the retail environment;

selecting, by the data processing system of the retailer, a customer to receive the electronic coupon based on marketing data associated with the customer, whereby the customer is a subscriber in a loyalty coupon system of the retail environment;

communicating, by the data processing system of the retailer, the electronic coupon directly to the customer, wherein the electronic coupon is received by the customer via a personal communication device equipped with a selecting function;

responsive to receiving a selection of the electronic coupon by the customer which indicates an interest in purchasing the product promoted by the electronic coupon, configuring, by the data processing system of the retailer, an account for a loyalty card associated with the customer in order for the customer to receive a customer reward through the loyalty coupon system for the product promoted by the electronic coupon;

responsive to the customer purchasing the product promoted by the electronic coupon using the loyalty card, disbursing, by the data processing system of the retailer, the customer reward to the customer at a point of sale;

tracking, by the data processing system of the retailer, a total number of electronic coupons redeemed by each of a mobile telephone number and an email address associated with the customer without using a clearinghouse; and billing, by the data processing system of the retailer, the manufacturer directly for a redeemed electronic coupon without using the clearinghouse.

2. The computer implemented method of claim 1, wherein the electronic coupon is in a form of a product advertisement.

3. The computer implemented method of claim 2, wherein the product advertisement is in the form of streaming video.

4. The computer implemented method of claim 1, wherein the customer reward consists of a face value of the electronic coupon.

5. The computer implemented method of claim 1, wherein the customer reward comprises a face value of the electronic coupon plus an additional customer reward for purchasing the product promoted by the electronic coupon.

6. The computer implemented method of claim 1, further comprising:

responsive to a user configuration, instructing, by the data processing system of the retailer, the inventory control system to automatically order additional product if a number of customer rewards configured for a product is greater than a number of the product in inventory.

7. A data processing system of a retailer for distributing and redeeming manufacturer coupons for a product in a retail environment comprising:

a bus system;
a communications system connected to the bus system;
a memory connected to the bus system, wherein the memory stores a set of instructions; and
a processing unit connected to the bus system, wherein the processing unit executes the set of instructions to receive an electronic coupon directly from a manufacturer that manufactures the product; link the electronic coupon to the product in an inventory control system of the retail environment; select a customer to receive the electronic coupon based on marketing data associated with the customer, whereby the customer is a subscriber in a loyalty coupon system of the retail environment; communicate the electronic coupon directly to the customer, wherein the electronic coupon is received by the customer via a personal communication device equipped with a selecting function; configure an account for a loyalty card associated with the customer in order for the customer to receive a customer reward through the loyalty coupon system for the product promoted by the electronic coupon in response to receiving a selection of the electronic coupon by the customer which indicates an interest in purchasing the product promoted by the electronic coupon; disburse the customer reward to the customer at a point of sale in response to the customer purchasing the product promoted by the electronic coupon using the loyalty card; track a total number of electronic coupons redeemed by each of a mobile telephone number and an email address associated with the customer without using a clearinghouse; and bill the manufacturer directly for a redeemed electronic coupon without using the clearinghouse.

8. The data processing system of claim 7, wherein the electronic coupon is in a form of a product advertisement.

9. The data processing system of claim 7, wherein the electronic coupon is in a form of streaming video.

10. The data processing system of claim 7, wherein the customer reward consists of a face value of the electronic coupon.

11. The data processing system of claim 7, wherein the customer reward comprises a face value of the electronic coupon plus an additional customer reward for purchasing the product promoted by the electronic coupon.

12. The data processing system of claim 7, wherein the processing unit executes a further set of instructions to instruct the inventory control system to automatically order additional product if a number of customer rewards configured for a product is greater than a number of the product in inventory in response to a user configuration.

13. A computer program product stored on a non-transitory computer readable medium including computer usable program code for distributing and redeeming manufacturer coupons for a product in a retail environment, the computer program product comprising:

computer usable program code for receiving, by a data processing system of a retailer, an electronic coupon directly from a manufacturer that manufactures the product;

computer usable program code for linking, by the data processing system of the retailer, the electronic coupon to the product in an inventory control system of the retail environment;

computer usable program code for selecting, by the data processing system of the retailer, a customer to receive the electronic coupon based on marketing data associated with the customer, whereby the customer is a subscriber in a loyalty coupon system of the retail environment;

computer usable program code for communicating, by the data processing system of the retailer, the electronic coupon directly to the customer, wherein the electronic coupon is received by the customer via a personal communication device equipped with a selecting function;

computer usable program code for configuring, by the data processing system of the retailer, an account for a loyalty card associated with the customer in order for the customer to receive a customer reward through the loyalty coupon system for the product promoted by the electronic coupon in response to receiving a selection of the electronic coupon by the customer which indicates an interest in purchasing the product promoted by the electronic coupon;

computer usable program code for disbursing, by the data processing system of the retailer, the customer reward to the customer at a point of sale in response to the customer purchasing the product promoted by the electronic coupon using the loyalty card;

computer usable program code for tracking, by the data processing system of the retailer, a total number of electronic coupons redeemed by each of a mobile telephone number and an email address associated with the customer without using a clearinghouse; and computer usable program code for billing, by the data processing system of the retailer, the manufacturer directly for a redeemed electronic coupon without using the clearinghouse.

14. The computer program product of claim 13, wherein the electronic coupon is in a form of a product advertisement.

15. The computer program product of claim 14, wherein the product advertisement is in the form of streaming video.

16. The computer program product of claim 13, wherein the customer reward consists of a face value of the electronic coupon.

17. The computer program product of claim 13, wherein the customer reward comprises a face value of the electronic coupon plus an additional customer reward for purchasing the product promoted by the electronic coupon.

18. The computer program product of claim 13, further comprising:

computer usable program code for instructing, by the data processing system of the retailer, the inventory control system to automatically order additional product if a number of customer rewards configured for a product is greater than a number of the product in inventory in response to a user configuration.

19. The computer implemented method of claim 1, further comprising:

responsive to receiving the electronic coupon directly from the manufacturer by the data processing system of the retailer, determining, by the data processing system of the retailer, whether a product promoted by the electronic coupon is in an inventory of the retailer; and responsive to a determination that the product promoted by the electronic coupon is in the inventory of the retailer, adding, by the data processing system of the retailer, the electronic coupon to a manufacturer coupon database associated with the data processing system of the retailer.

20. The computer implemented method of claim 1, wherein the data processing system of the retailer receives the mobile telephone number and the email address from the customer and stores the mobile telephone number and the email address associated with the customer in a customer database.

* * * * *